United States Patent [19]
Chang

[11] Patent Number: 5,997,356
[45] Date of Patent: Dec. 7, 1999

[54] ELECTRONIC CARD CONNECTOR HAVING CARD-BIASING MEANS

[75] Inventor: Yao Hao Chang, Chung-Ho, Taiwan

[73] Assignee: Hon Hai Precision Ind. Co., Ltd., Taipei Hsien, Taiwan

[21] Appl. No.: 09/119,147

[22] Filed: Jul. 20, 1998

[30] Foreign Application Priority Data

Oct. 9, 1997 [TW] Taiwan .................................. 86215574

[51] Int. Cl.⁶ .................................................. H01R 23/70
[52] U.S. Cl. ............................................ 439/630; 235/441
[58] Field of Search .................................. 439/630; 77/83, 77/876, 260; 235/441

[56] References Cited

U.S. PATENT DOCUMENTS

| | | | |
|---|---|---|---|
| 5,012,078 | 4/1991 | Pernet ...................................... | 235/441 |
| 5,286,957 | 2/1994 | Defrasne .................................. | 235/441 |
| 5,949,048 | 9/1999 | Nakamura et al. ...................... | 235/439 |

*Primary Examiner*—Khiem Nguyen
*Assistant Examiner*—Michael C. Zanoli

[57] ABSTRACT

An electronic card connector consists of an upper housing member and a lower housing member fixedly connected together. A number of contacts are fixed to the lower housing member. Each contact has a contact portion for electrically engaging with a card inserted into the connector and a tail portion for being soldered to a printed circuit board on which the connector is mounted. The upper housing member forms a number of cantilevered arms with enlarged free ends biasing the card inserted into the connector toward the contact portions of the contacts to ensure a positive engagement between the card and the contacts.

8 Claims, 4 Drawing Sheets

ELECTRONIC CARD CONNECTOR HAVING CARD-BIASING MEANS

BACKGROUND OF THE INVENTION

1. Field of The Invention

The present invention relates to an electrical connector, and particularly to a card connector for connecting an electronic card to a printed circuit board in an electrical apparatus.

2. The Prior Art

Recently, a variety of card connectors have been developed to connect electronic cards to PCBs in different electrical apparatus thereby achieving different functions.

FIG. 4 shows a conventional card connector 5 with a card 6 inserted thereinto. The connector 5 consists of an upper housing member 51, a lower housing member 52 fixed to the upper housing member 51 and defining a slot 54 therebetween with an inlet 53. A number of contacts 55 are fixed to the lower housing member 52. The card 6 is inserted into the slot 54 via the inlet 53 to electrically connect with the contacts 55 whereby electrical signals can be transmitted from the card to a printed circuit board (not shown) on which the connector 5 is mounted.

The contacts 55 engage with the card 6 only by a spring force of the contacts 55 which is insufficient to ensure a firm engagement therebetween, resulting in a high contact resistance (CR) and, thus, an inferior signal transmission quality.

To overcome the disadvantage of the prior art, U.S. Pat. No. 5,000,694 discloses a card connector having a mechanism which ensures that the card firmly engages with the contacts. However, the mechanism disclosed in the '694 patent has a relatively complicated structure, resulting in a high cost of the connector.

Hence, an improved card connector is needed to eliminate the above mentioned defects of current card connectors.

SUMMARY OF THE INVENTION

Accordingly, an objective of the present invention is to provide a card connector with a mechanism which can bias a card inserted into the connector toward the contacts to ensure continuous contact between the card and the contacts.

Another objective of the present invention is to provide a card connector with a mechanism which can bias an inserted card toward the contacts to cause the card to firmly engage therewith, wherein the mechanism has a simple structure which reduces the cost of the connector.

To fulfill the above mentioned objectives, according to one embodiment of the present invention, an electronic card connector includes a lower housing member and an upper housing member fixed to the lower housing member. A number of contacts are fixed to the lower housing member. Each contact has a contact portion for electrically engaging with an electronic card inserted into the connector and a tail portion for being soldered to a printed circuit board on which the connector is mounted. The upper housing member is integrally formed with four cantilevered arms in four slots in the upper housing member. Each cantilevered arm has an enlarged free end biasing the electronic card inserted into the connector toward the contact portions of the contacts to ensure a firm engagement between the electronic card and the contacts.

DETAILED DESCRIPTION OF THE PREFERRED EMBODIMENT

Reference will now be made in detail to the preferred embodiment of the present invention.

Figure 1:
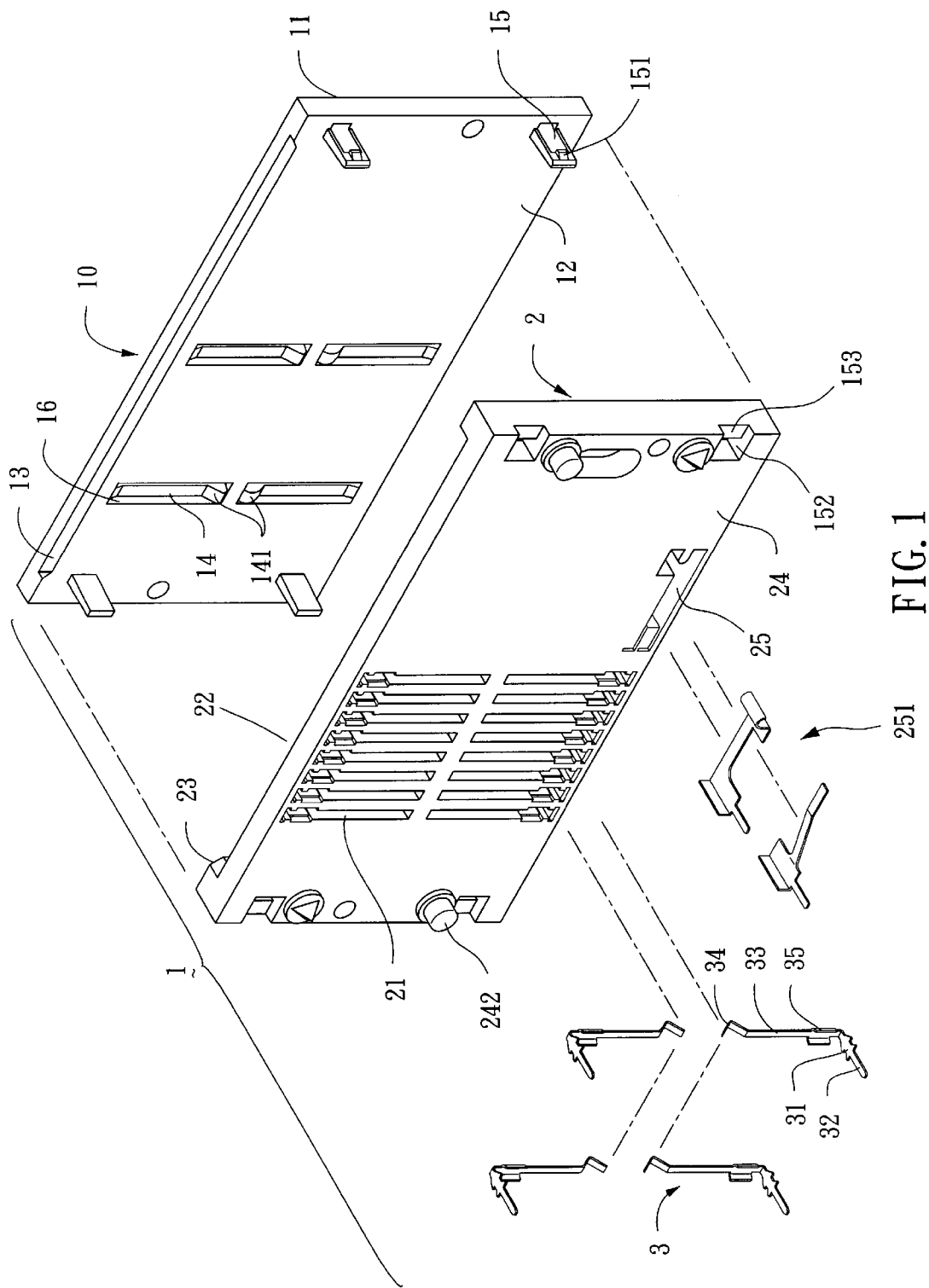
FIG. 1 is a perspective, exploded view of a card connector in accordance with the present invention.
Figure 2:
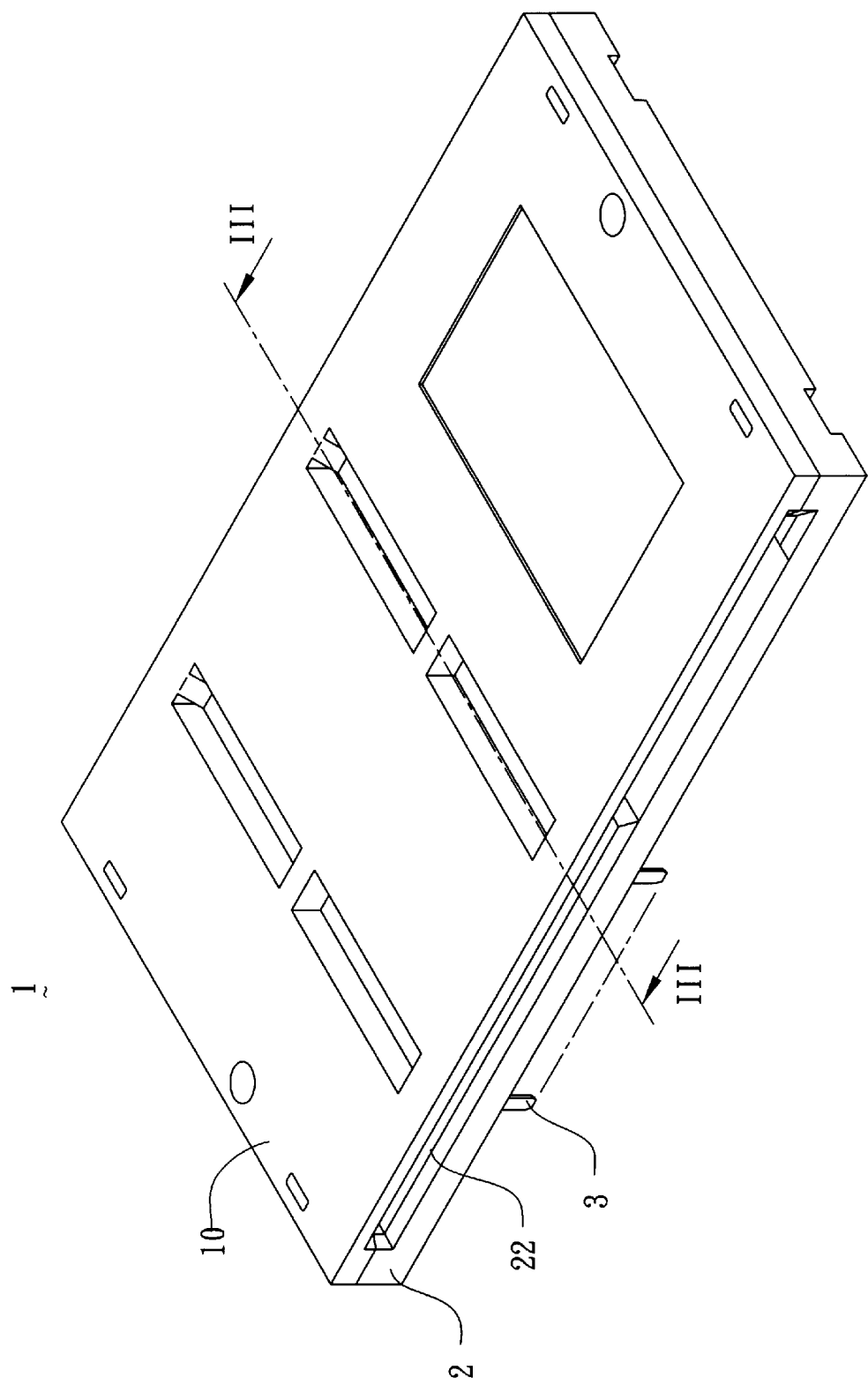
FIG. 2 is a perspective, assembled view of the card connector of FIG. 1 as viewed from a different direction.
Figure 3:
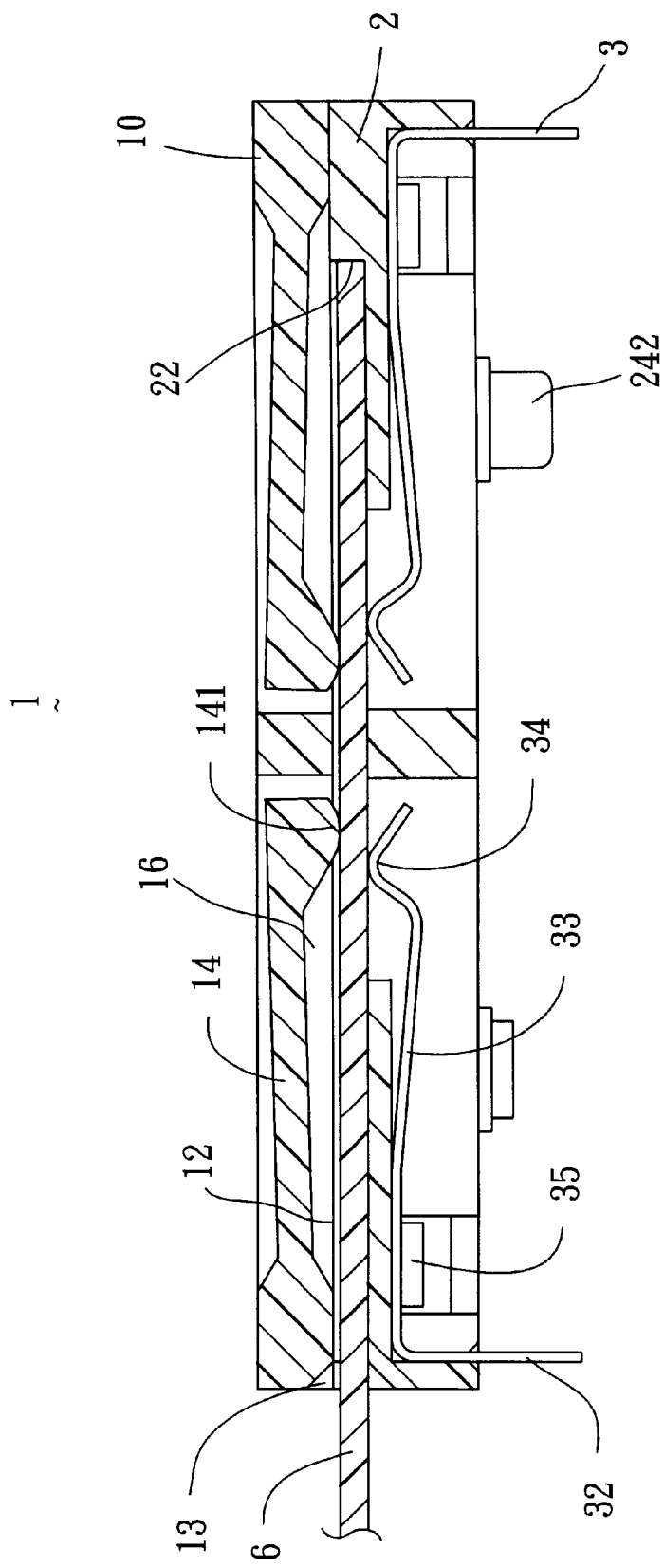
FIG. 3 is a cross-sectional view taken along line III—III of FIG. 2 with a card inserted into the connector.
Figure 4:
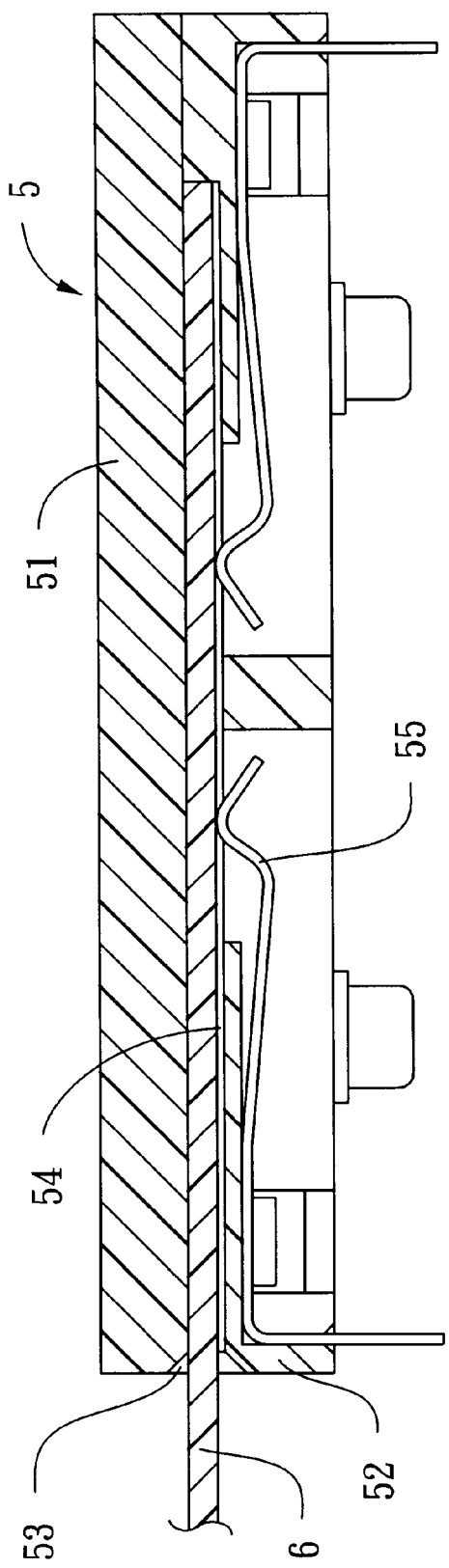
FIG. 4 is a cross-sectional view of a conventional card connector with a card received therein.

Referring to FIGS. 1 to 3, a card connector 1 in accordance with the present invention includes an upper housing member 10 formed with a rectangular body (not labeled) having an outer face 11 and an inner face 12, four mounting legs 15 extending from four corners of the inner face 12, a chamfer 13 defined along a lengthwise side of the body near the inner face 12, and four deflectable cantilevered arms 14 extending into four slots 16 in the upper housing member 10. Each arm 14 has an enlarged free end 141 projecting beyond the inner face 12. Each mounting leg 15 forms an engaging hook 151 at a free end thereof.

The arm 14 forms a middle portion (not labeled) being thinner than the two end portions thereof. The enlarged free end 141 downwardly projects below the middle portion and forms an arcuate surface (not labeled) for a smooth engagement with the electronic card 6. The arm 14 is spaced from the card 6 except for the enlarged free end 141.

A lower housing member 2 is formed with a rectangular body (not labeled) having an outer face 24 and an inner face 23, two board locks 242 projecting from the outer face 24 for interferentially fitting with a printed circuit board (not shown) on which the card connector 1 is mounted, a recess 22 defined in the inner face 23, a number of contact passageways 21 defined in the body parallel to lateral sides thereof, and a switch passageway 25.

A number of contacts 3 each has a body 33 and a tail 32 perpendicular to the body 33. The body 33 is formed with a contact portion 34 at a free end thereof for electrically engaging with an electronic card 6 inserted into the connector 1, and a first fitting portion 35 formed as tabs. The tail 32 is soldered to the printed circuit board and has a second fitting portion 31 formed as barbs. When the contacts 3 are mounted in the contact passageways 21, the first and second fitting portions 35, 31 interferentially fit with the lower housing member 2 so that the contacts 3 are fixed in the contact passageways 21. A pair of switch contacts 251 are fixed to the switch passageway 25 such that when there is no card inserted into the connector 1, the switch contacts 251 contact with each other, and when a card is inserted into the connector 1, the switch contacts 251 become separated. As the overall structure of such switch contacts 251 received within the switch passageway 25 and the function achievable by the switch contacts 251 are well known by those skilled in the art and irrelevant to the inventive features of the present invention, a detailed description thereof is omitted herein. Four mounting holes 152 are defined in four corners of the lower housing member 2 and form four steps 153 below the outer face 24. To assemble the upper and lower housing members 10, 2, the four mounting legs 15 are extended through the corresponding four mounting holes 152 to reach a position in which the engaging hooks 151 of the mounting legs 15 fixedly engage with the steps 153. (Although this is not shown in the drawings, this can be easily understood by those skilled in the art.)

Particularly referring to FIG. 3, when a card 6 is inserted into the connector 1 and received in the recess 22 via the chamfer 13, the enlarged free ends 141 of the cantilevered arms 14, which are integrally formed with the upper housing member 10 and project beyond the inner face 12 thereof, bias the card 6 toward the contact portions 34 of the contacts 3 to ensure that the card 6 has a firm engagement with the contacts 3.

The cantilevered arms 14 disclosed by the present invention have a simple structure and can effectively bias the card 6 toward the contacts 3 to ensure a firm engagement therebetween; thus, the present invention qualifies to be granted a patent.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

I claim:

1. An electrical connector, comprising:
    a dielectric housing composed of an upper housing member integrally formed with at least one cantilevered arm and a lower housing member proximal to a printed circuit board, said lower housing member defining a recess for receiving an electronic card therein, said upper housing member having an inner face, the at least one cantilevered arm partially extending below the inner face into the recess of the lower housing member; and
    a number of contacts fixedly received in the lower housing member, each contact having a contact portion electrically engaging with the card;
    the at least one cantilevered arm biasing a top face of the card toward the contact portions of the contacts to ensure a firm engagement between the card and the contacts.

2. The electrical connector in accordance with claim 1, wherein the cantilevered arm has a free end biasing the card.

3. The electrical connector in accordance with claim 2, wherein the free end is larger than the other portion of the cantilevered arm.

4. The electrical connector in accordance with claim 1, wherein the cantilevered arm is received in a slot defined in the upper housing member.

5. The electrical connector in accordance with claim 1, wherein the upper housing member has a rectangular shape and defines a chamfer along a lengthwise side thereof in communication with the recess.

6. The electrical connector in accordance with claim 1, wherein the upper housing member has a mounting leg extending through a mounting hole defined in the lower housing member to fixedly engage with the lower housing member.

7. An arrangement for firm engagement between a card and contacts of a card connector, comprising:
    a housing defining a recess for receiving the card therein;
    said contacts projecting into the recess for being adapted to abut against the card;
    said card being adapted to be received within the recess for engagement with the corresponding contacts on one side; and
    deflectable device positioned on the other side of the card and initiating a biasing force against the card; wherein
    said deflectable device includes plural spring arms extending from another housing which is attached to the housing having said contacts therein.

8. The electrical connector in accordance with claim 1, wherein the at least one cantilevered arm forms a middle portion being thinner than two end portions thereof.

* * * * *